United States Patent [19]

Saadat

[11] Patent Number: 4,711,037
[45] Date of Patent: Dec. 8, 1987

[54] DEVICE FOR MEASURING DIMENSIONS OF OBJECTS

[76] Inventor: Mohammad M. Saadat, 219 Cherry St., Katonah, N.Y. 10536

[21] Appl. No.: 902,062

[22] Filed: Aug. 26, 1986

Related U.S. Application Data

[63] Continuation of Ser. No. 712,684, Mar. 18, 1985, abandoned.

[30] Foreign Application Priority Data

Apr. 2, 1984 [DE] Fed. Rep. of Germany ....... 3412253

[51] Int. Cl.⁴ .............................................. G01B 5/00
[52] U.S. Cl. .................................. 33/520; 33/178 F; 33/543
[58] Field of Search ................. 33/178 R, 178 F, 542, 33/543, 189, 191

[56] References Cited

U.S. PATENT DOCUMENTS

| | | | |
|---|---|---|---|
| 2,812,587 | 11/1957 | Roussin | 33/178 F |
| 2,876,413 | 3/1959 | Saurenmon et al. | 33/178 F X |
| 3,349,498 | 10/1967 | Oliver et al. | 33/178 F |
| 3,423,671 | 1/1969 | Vezin | 33/178 F X |

Primary Examiner—William D. Martin, Jr.
Attorney, Agent, or Firm—Martin A. Farber

[57] ABSTRACT

A measuring device for universal application includes a parallel-crank mechanism directly rotary mounted on the slider of an isosceles centered slider-crank mechanism. The measuring element or pin is adapted on the coupler of the constrained guide mechanism. All points of coupler plane including the measuring element are moved along exactly straight lines parallel to each other at right angle to the axis of the slider. The simple change-over of a lever against its other abutment turns the active direction of a spring and enables the resetting of the measuring device from internal to external measurement. Alternatively, two-point or three-point or relative measurements can be executed. The modular unit system permits, if desired, an arrangement of two or more of the constrained guide linkages according to the invention on the sliding axis whose sliders are rigidly connected in groups of preferably three. Among all measuring elements of the same group a constrained motion exists, owing to this the measuring device is self-centered on the axis of the common slider by spring force in internal as well as in external measurement. Adaptable measuring elements enlarge the measuring range and extend the economic benefits of the device. Many difficult problems of measurement are solved in an obviously simple manner with one and the same measuring device. A measuring device according to the invention is also well suited as a measuring gripper for a handling device.

17 Claims, 10 Drawing Figures

DEVICE FOR MEASURING DIMENSIONS OF OBJECTS

RELATED APPLICATION

This application is a continuation of my application Ser. No. 712,684 filed Mar. 18, 1985 (now abandoned).

BACKGROUND OF THE INVENTION

The invention relates to a measuring device, in particular for internal or external diameters, comprising at least one measuring element and means for self-centering the device.

Various devices have been proposed for measuring but these did not offer maximum convenience and were unsuitable for universal application.

Therefore, it is a primary object of the invention to provide a measuring device for universal application, that is to say generally, linear measurement, depth measurement, internal and external diameter measurement, two and more measurements at the same time and last not least relative measurements of for instance two diameters, all with one and the same device. It is an object of the invention to provide a measuring device in the form of a modular building unit. It should be possible to design a special measuring device using uniform components fitted to a special application.

It is another object of the invention to provide a self-centering device using spring force combined with constrained motion among correlating measuring elements.

SUMMARY OF THE INVENTION

It has been found that the foregoing objects can best be accomplished by a measuring device including one or more measuring elements or pins each mounted on the coupler plane of a constrained six-bar guide linkage whose coupler plane receives an exactly straight motion guide. The constrained six-bar guide linkage according to the invention includes an isosceles centered slider-crank mechanism and a parallel-crank mechanism whose two rods are directly jointed on the slider of the slider-crank mechanism. One rod of the parallel-crank mechanism, therefore, is coupler of the slider-crank mechanism. The isosceles centered slider-crank mechanism is rotary jointed with its straight motion guided point on the coupler of the parallel-crank mechanism. The parallel-crank mechanism serves to guide the whole coupler plane parallel to the sliding axis of the slider-crank mechanism. Each measuring element is urged by spring force in its active direction, radially inward for external measuring the radially outward for internal measuring due to the active direction of spring force. A simple turn-over of the spring attached lever against its other abutment alters the active direction of the spring force from internal to external measuring. The relative motion between one measuring element and the sliding rod of the slider-crank mechanism is identical to the measuring value and reacts to a dial indicator.

The simplest arrangement includes only one constrained six-bar guide linkage. For two-point measurements a second measuring element can be adapted on the elongated sliding rod opposite the first. For two-point measurements the device can also be provided with two guide linkages according to the invention, whose two sliders are rigidly connected to each other for constrained motion between measuring elements. As a result of the constrained motion between measuring elements the acting spring forces have a self-centering effect.

The most practical arrangement, however, is a star-shaped distribution of three guide linkages according to the invention around its sliding axis whose sliders are again connected to each other. In this arrangement the measuring device is self-centered by spring force as well in internal as in external measuring of diameters.

An arrangement including more than three guide linkages according to the invention distributed star-shaped around the sliding axis is very advantageous, if its sliders are connected to each other in groups. Constrained motion exists among all measuring elements of the same group. A measuring device thus arranged can indicate two diameters at the same time. For example it its possible to determine the amount of eccentricity of the external to the internal diameter of a tube. Another example is the indication of either two internal or two external diameters or one internal and one external diameter of for example a polygonal profile or a serration, respectively.

A desired damping of relative motion with a soft end abutment is preferably realised by a dampening device using relative motion between sliding rod and common slider of the isosceles centered slider-crank mechanisms.

A measuring device according to the invention is also well suited in use as a measuring gripper of a handling device for automatic measuring and control in automatic manufacturing.

A measuring device according to the invention is, therefore, very universal in application, because many difficult problems in measuring can be solved with one and the same device.

These and other features and advantages of the invention disclosed herein will become more clearly understood upon consideration of the following specification and accompanying drawings wherein identical characters of reference designate corresponding parts throughout the different views and in which:

These figures and the following detailed description disclose specific embodiments of the invention, however, it is to be understood that the inventive concept is not limited thereto since it may also be embodied in other forms.

DETAILED DESCRIPTION OF ILLUSTRATIVE EMBODIMENTS

Figure 1:
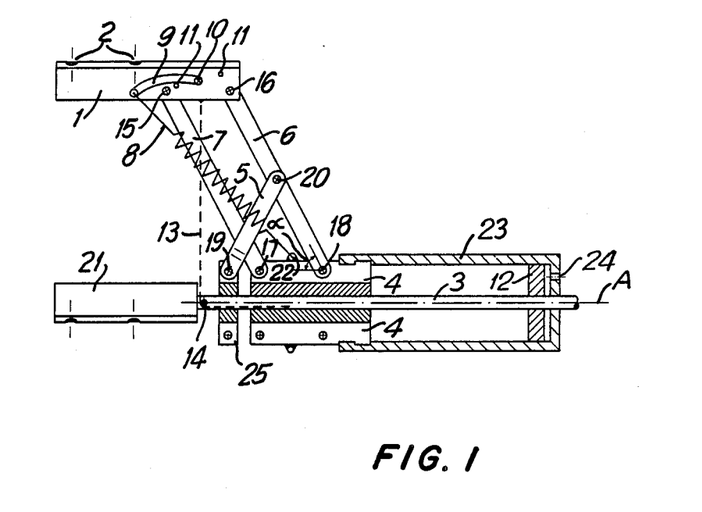
FIG. 1 is a longitudinal schematic section through a first embodiment of a measuring device according to the invention, including only one constrained guide linkage.

Referring now to FIG. 1 in which a sliding rod 3 represents the fixed reference system. Arranged on sliding rod 3 is a slider-crank mechanism consisting of a slider 4, a coupler 6 and a crank 5 rotary jointed on a ring 25 which is fixed on sliding rod 3.

The slider-crank mechanism 3,4,5,6 has special kinematic dimensions, because first it is isosceles, i.e. crank 5 (distance between the rotary joints 19 and 20) is just as long as coupler 6 (distance between the rotary joints 18 and 20). Second, the slider-crank mechanism 3,4,5,6 is centered, i.e. rotary joint 19 of crank 5 on sliding rod 3 and rotary-joint 18 of coupler 6 on slider 4 are positioned on a parallel line to the sliding axis A. Because of these kinematic dimensions point 16, which is arranged on the elongated line crossing the rotary joints 18 and 20 of coupler 6 on the side of crank rotary joint 19, receives an exactly straight guide motion vertical to sliding axis A crossing crank joint 19. In the straight line guided coupler point 16 a further coupler 1 of a parallel-crank mechanism is rotary-jointed which consists of two rods 6 and 7 rotary-jointed on slider 4.

In this arrangement all points of moving coupler plane 1 get an exactly straight line motion vertical to sliding axis A if slider 4 is moved along its sliding rod 3. Coupler 1 can be shaped directly as measuring element. Additional measuring elements or measuring pins can also be mounted on coupler plane 1. The measuring elements or pins can be directed outward for internal measurement as well as inward for external measurement. The measuring elements or pins can also be spring-mounted at axis 2 of coupler 1 to enable relative measurements.

An additional lever 9 is rotary-jointed at 10 between the swivel joints 15 and 16 of coupler 1, as shown in FIG. 1. Spring 8 acts on the end of that bent lever 9 through which it is urged against a first fixed stop 11. Spring 8 acts with its one end on lever 9 on the outside of the swivel joints 15 and 16 and with its other end (at 22) on slider 4 between its both swivel joints 17 and 18. The connection line between application point of spring 8 on slider 4 and axis of swivel joint 10 of lever 9 is central and parallel to both rods 6 and 7 of parallel-crank mechanism 1,4,6,7. Lever 9 can, naturally, be arranged analogously on slider 4. As shown in FIG. 1 spring 8 causes a torque that urges the measuring element in radial outward direction for internal measurement. Lever 9 can be turned around its swivel joint 10 against another fixed stop 11 mounted on the other side of rotary joint 10 in that manner that the measuring element is urged in radial inward direction for external measurement. Practically the fixed stops 11 are arranged on coupler 1 in such a manner that spring 8 generates the same pressure for internal as for external measurement. Thus arranged the active lever arm takes off with increasing spring force so as to have a constant pressing force in measurement as well for internal as for external measurements all over the range of the measuring device. Spring 8 causes all swivel joints 15,16,17,18 of the parallel-crank mechanism 1,4,6,7 in both its positions to be contacted as is necessary for measurement. Therefore, there is never any change of contact in the swivel joints 15 to 20 neither in internal nor in external measuring.

For dial indication the exactly straight motion of coupler 1 relative to sliding rod 3 is used. It is possible to use a thread 13, as shown in FIG. 1, which is vertically guided and is turned at sliding axis A around a tail or pin 14 reacting to a dial indicator (not shown in FIG. 1) mounted on the turned-off end of sliding rod 3. Thread 13 can be fixed on every possible point of coupler 1. The relative motion between coupler 1 to sliding rod 3 is directly corresponding to the indicated value. For dial indication the relative motion between slider 4 and sliding rod 3 can also be used. In this case the measuring diameter is directly proportional to the measuring value and for indication it must be converted by the relation between the moving distance of slider 4 and the angle α of crank 5 to sliding axis A of slider 4. This kind of measuring calculation, therefore, is preferably suitable for electronic measurement. More exactly the measuring value can be determined using the theorem of Pythagoras, because the measuring way is always rectangular to the distance between rotary joint 19 of crank 5 on ring 25 to the rotary joints 17 or 18 of both rods 6 or 7, respectively, of the parallel-crank mechanism 1,4,6,7 on slider 4.

Between slider 4 and its sliding rod 3 a screw-drive can also be arranged, not shown in FIG. 1. In this case ring 25 must be adapted axially fixed and rotary moveable on sliding rod 3.

Slider 4 is practically shaped as a handle, therefore the measuring device can be operated by relative motion between handle and sliding rod 3. After releasing of slider 4 the measuring element will be urged in its selected active direction. Of course, it is also possible to use coupler 1 for handling.

In particular dial indicators having an analog indication can be damaged by jerky movement. Therefore, a dampening device can be integrated into handle 4, as shown in FIG. 1. In this case a piston 12 is rigidly fixed on sliding rod 3 and slider 4 is rigidly connected with a handle 23 in which an internal cylinder is arranged, whose axial length defines the measuring range. In the bottom of handle 23 a throttle bore 24 is arranged retarding the motion of slider 4. Of course, it can also be used a cylinder closed on both sides of piston 12 which has two throttle bores 24 directed radially outward near its two ends. In this case each throttle bore 24 is closed by piston 12 before arriving at its end position in such way that an adequate cushion of air remains to effect a soft end abutment, not shown in FIG. 1. Said dampening device can be arranged in the same manner in a vertical position between coupler 1 and sliding rod 3. In this case piston and cylinder must be fixed on coupler 1 or sliding rod 3, respectively.

In the arrangement described the measuring device permits a one-point measurment if sliding axis A of sliding rod 3 is in a defined position to the measuring object. For instance, measuring device with its sliding rod 3 and measuring object will be positioned on a plane base.

To permit two-point measurements the guide linkage shown in FIG. 1 can have a second measuring element 21 fixed on the elongated sliding rod 3 on the opposite side of the first measuring element on coupler plane 1.

Figure 2:
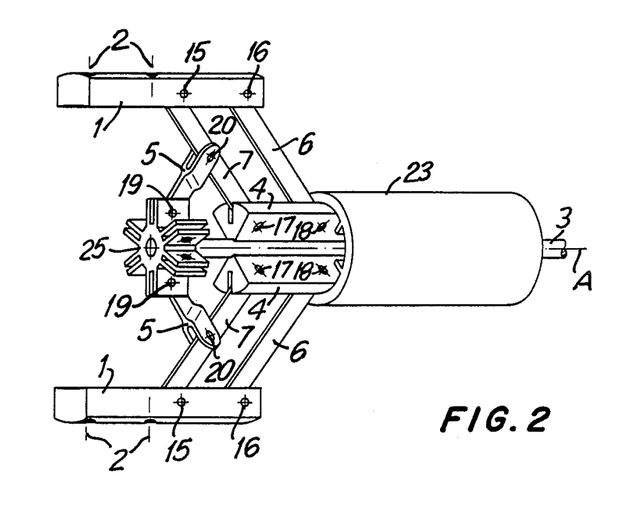
FIG. 2 is a perspective view illustrating a second embodiment according to the invention including two mirror-inverted constrained guide linkages having a common slider.

For the purpose of two-point measurements two of the described guide linkages according to the invention can also be arranged which are positioned mirror-inverted to each other according to sliding axis A, as shown in FIG. 2. In this case both measuring elements or pins must be mounted on the couplers 1 of both guide linkages. Both sliders 4 of the opposite guide linkages must be rigidly connected in order to have constrained motion between both couplers 1 by handle 23 in which the dampening device is arranged as described before in reference to FIG. 1. It is also possible to arrange both guide linkages 1 and 3 to 7 on a common slider 4, not shown in FIG. 2. As a result of the constrained motion between both measuring elements couplered to each other and contacting an internal diameter surface in line contact, the measuring device is self-centered on sliding axis A in case of internal measurements. Using concave surfaces on the inner side of both measuring elements the measuring device is as well self-centering in case of external measurements. According to FIG. 2 both cranks 5 are rotary jointed with their forked end on the other rod 7 of corresponding parallel-crank mechanisms 1,4,6,7 in kinematic analog way compared to FIG. 1.

Ring 25 is obviously prepared to receive from one to six cranks 5 of corresponding guide linkages 1 and 3 to 7. Therefore, the most practical arrangement, that is to say a star-shaped distribution of three constrained guide linkages 1 and 3 to 7 according to the invention around sliding axis A is easily possible which enables three-point measurements, because the measuring device in this arrangement is self-centered on sliding axis A as well in internal as in external measurements of diameters. After releasing handle 23 the whole measuring device is self-aligning by spring force with its sliding axis A on the axis of measuring diameter. The simple turn-over of three levers 9 around its swivel joint 10 from one fixed stop 11 to the other, as shown in FIG. 1, permits a resetting of the measuring device from internal to external measuring.

Figure 3:
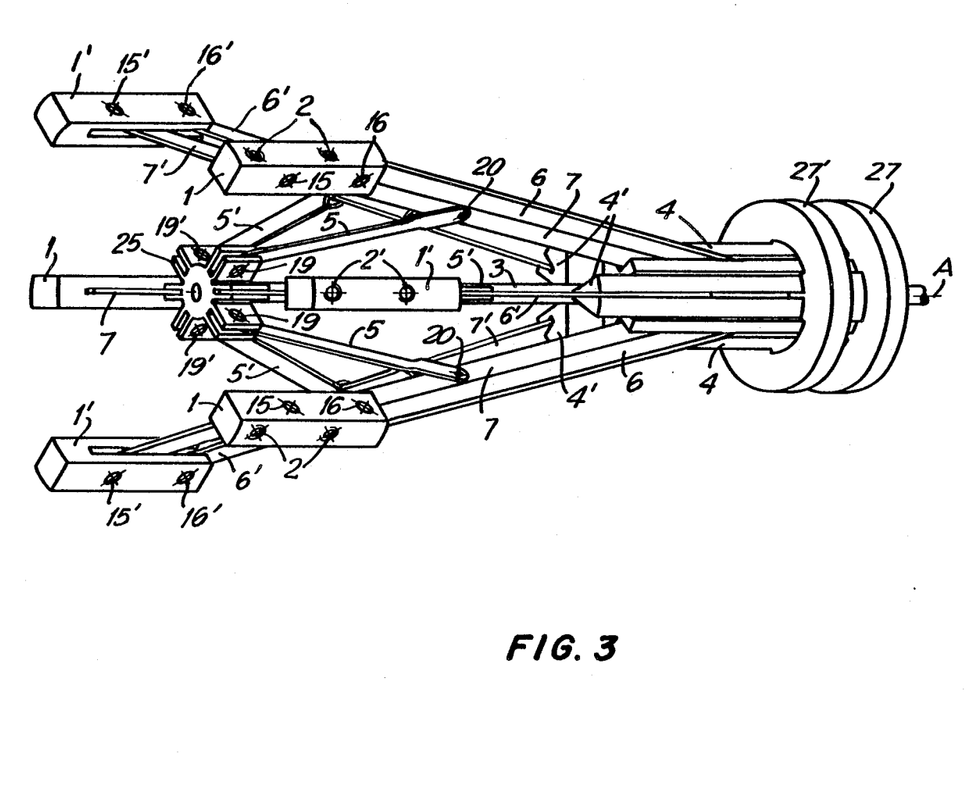
FIG. 3 is another perspective view illustrating another embodiment of a measuring device according to the invention having altogether six star-shaped constrained guide linkages whose sliders are rigidly connected to each other in two groups of three by three on the same sliding rod of the slider-crank mechanisms whereby each slider of the first group is axially moveable between two sliders of the second group.
Figure 4:
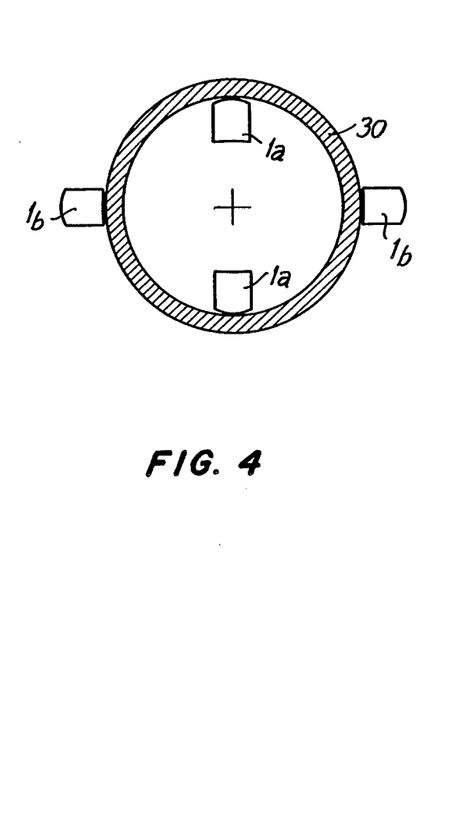
FIGS. 4 to 8 show exemplarily various possibilities of measuring methods permitted by a measuring device according to the invention.
Figure 5:
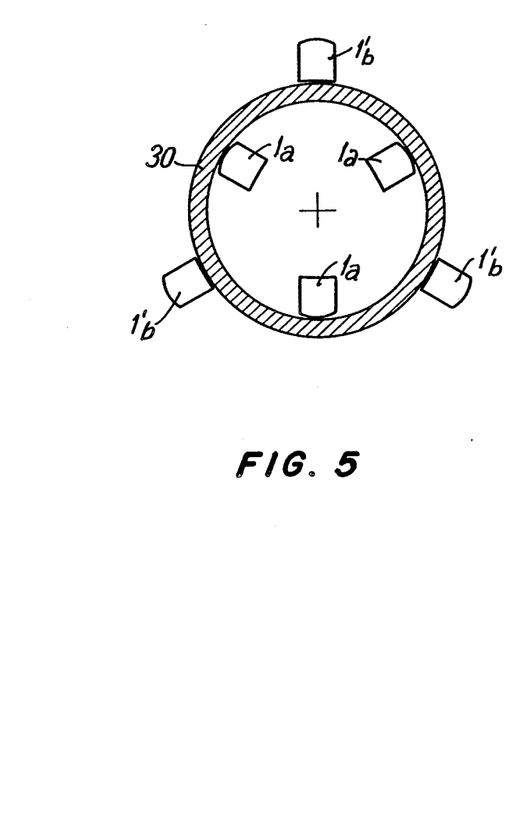
Figure 6:
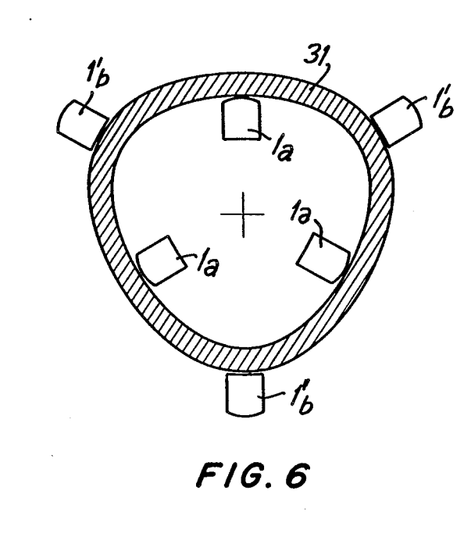
Figure 7:
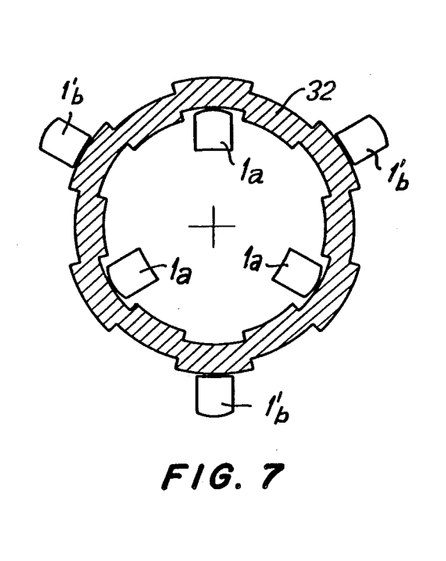
Figure 8:
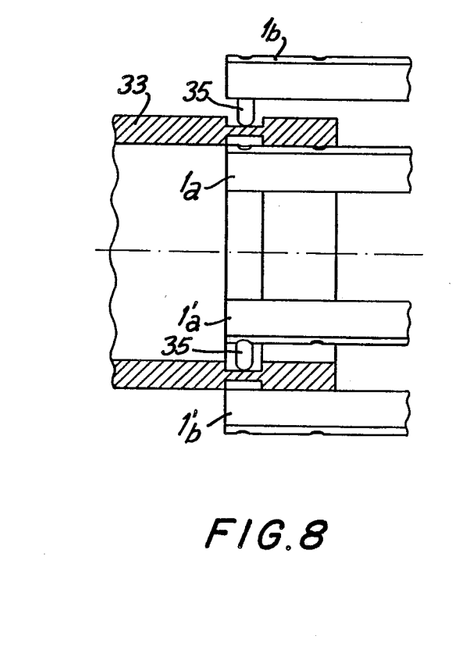

On sliding axis A, however, also more than three guide linkages according to the invention can be arranged. In this arrangement the sliders 4 must be connected in groups for constrained motion among those measuring elements connected to each other. Referring to FIG. 3 in which an arrangement of six symmetrically displaced guide linkages is shown, one group of three constrained guide linkages 1 and 3 to 7 is indexed by ' and the other group is illustrated without index. Each slider 4' of the first group ' is arranged axially moveable between two sliders 4 of the second group on same sliding rod 3. Same is true for all other corresponding links. The first group of three sliders 4' is rigidly connected by a first ring 27' and the second group of three sliders 4 is ridgidly connected independently of the first 4' by a second ring 27. Rings 27 and 27' are arranged in tandem. A measuring device thus arranged permits the measuring of two or more diameters at the same time as well as relative measurings of two diameters. A measuring device of such design can solve many difficult problems in measuring in a remarkably simple manner. Various examples are shown in FIGS. 4 to 8:

Referring now to FIG. 4 in which the mirror-inverted arrangement of one group of two constrained guided measuring elements 1a is shown first of all for a two-point measurement of the internal diameter of a tube 30. The measuring elements are concave-shaped on their inward and convex-shaped on their outward surface. After a turn-over of levers 9 (compare to FIG. 1) from one into the other position the measuring elements 1a change their position in the arrangement indicated with 1b for external measurement of the same tube 30. The measuring device is self-centering on the axis of tube 30 in internal as well as in external measurement. Referring to FIG. 5 two groups of three measuring elements are indicating the internal and external diameter of a tube 31, each, 1a,1b are connected for constrained motion. With the same measuring device at the same time two different internal diameters, two different external diameters as well as one internal and one external diameter can be indicated, for example of a polygonal profile as shown in FIG. 6. FIG. 7 shows analogously the measuring of a serration. Naturally, with this mode of application two diameters can be indicated at the same time. Referring to FIG. 8 there are again two constrained groups of measuring elements 1,1': One group 1a or 1'b, respectively, is executing an internal or an external measurement, while the other group 1'a or 1b, respectively, is executing with its measuring elements mounted on axis 2 a relative measurement of the internal or the external diameter of an annular groove, respectively.

Figure 9:
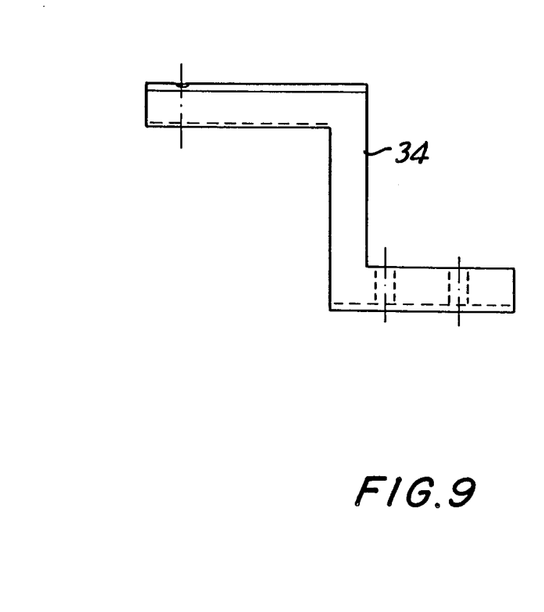
FIG. 9 is a front view of an additional measuring element adaptable on the coupler plane of the guide linkages or on the sliding rod of the slider-crank mechanisms, respectively, and in FIG. 10 another measuring method is shown, which can be carried out by adapting other meauring elements or pins on the coupler planes of one and the same device.

Referring now to FIG. 9 an adaptable measuring element 34 is shown, which can be attached either on coupler 1 or on the elongated sliding axis A of sliding rod 3, in order to enlarge the measuring range of the device.

Figure 10:
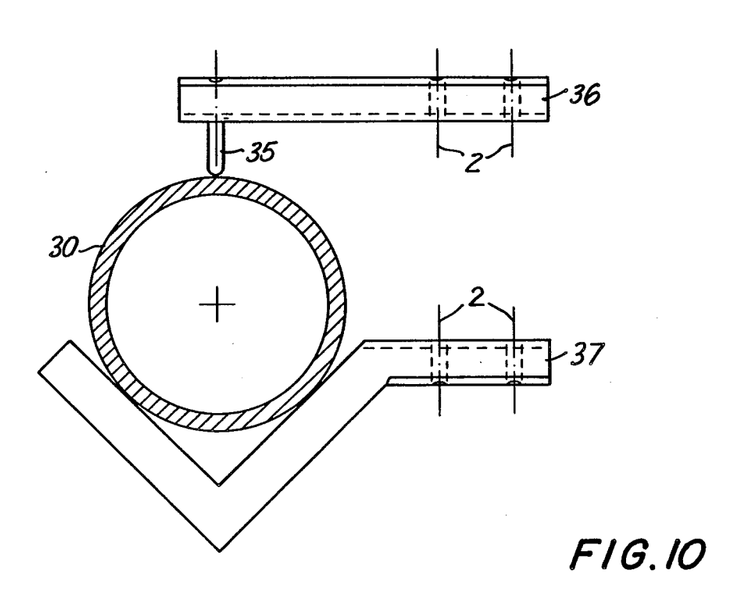

According to FIG. 10 two further measuring elements 36,37 are shown being adaptable either on coupler 1 or on the elongated sliding rod 3 for instance to enable a radial three-point-measurement of external diameters.

What I claim is:

1. A measuring device, for measuring dimensions of objects, comprising
    a guide linkage comprising
    a sliding rod,
    a coupler having a first sensing element adapted to engage an object to be measured,
    a slider slidably mounted on said sliding rod,
    two links pivotally connected adjacent respective ends thereof to said slider and to said coupler at respective first pivot points forming at least approximately a parallelogram, and
    a crank operatively pivotally connected adjacent respective ends thereof to said sliding rod and to a center of one of said links at respective second pivot points, the crank having a length between said second pivot points equal to half the length of said one link between said first pivot points of said one link;
    means comprising an indicator for indicating position of said coupler relative to said sliding rod; and
    means for biasing said coupler by spring force in a direction with respect to the object to be measured such that said indicator is responsive to relative movement of said coupler with respect to said sliding rod.

2. The measuring device according to claim 1, wherein
    said indicator is a dial indicator.

3. The measuring device according claim 1, comprising
    a second sensing element mounted on said sliding rod, and wherein
    said sliding rod is elongated.

4. The measuring device according to claim 1, including
a plurality of said guide linkages having one said sliding rod in common, said sliding rod defining a sliding axis,
said guide linkages are arranged star-like around said sliding axis,
said sliders are fixedly connected in at least one group.

5. The measuring device according to claim 4, further comprising
a plurality of levers corresponding to said plurality of guide linkages, each said lever is pivotally mounted at a lever pivot point on a corresponding coupler of said guide linkages between corresponding of said first pivot points,
said biasing means each comprising a spring, each said spring has one end on said slider located between corresponding to said first pivot points and another end thereof on said lever,
two fixed stops on said corresponding coupler,
each said lever is turnable over from one of said fixed stops to the other of said fixed stops, and
said another end of said spring is outside of both of said first pivot points on said coupler when said lever contacts respective of said two fixed stops.

6. The measuring device according to claim 5, wherein
in each said guide linkage said lever pivot point of each said lever and said one end of said spring on said slider form a parallelgram relative to pairs of said first pivot points on said slider and coupler.

7. The measuring device according to claim 1, further comprising
sensing means on said coupler for increasing measuring range of the device.

8. The measuring device according to claim 7, wherein
said sensing means is a measuring element.

9. The measuring device according to claim 7, wherein
said sensing means is a pin.

10. The measuring device according to claim 7, wherein
said sensing means is a measuring element and a pin.

11. The measuring device according to claim 2, wherein
said dial indicator is actuated by relative motion between said coupler and said sliding rod.

12. The measuring device according to claim 2, wherein
said dial indicator is actuated by relative motion between said slider and said sliding rod with linear measurement.

13. The measuring device according to claim 2, wherein
said dial indicator is actuated by relative motion between said slider and said sliding rod.

14. The measuring device according to claim 2, wherein
said dial indicator is actuated by relative motion between said slider and said sliding rod, and
said dial indicator comprises means for indicating said relative motion.

15. The measuring device according to claim 1, further comprising
dampening means for damping relative motion between said sliding rod and said slider.

16. The measuring device according to claim 1, further comprising
a lever pivotally mounted on one of said slider and said coupler at a lever pivot point between corresponding of said first pivot points,
said biasing means comprises a spring having one end on said lever and another end on said other of said slider and said coupler between the other corresponding said first pivot points,
two fixed stops on said one of said slider and said coupler,
said lever is turnable over from one of said fixed stops to the other of said fixed stops, and
said one end of said spring is outside of both of said first pivot points when said lever contacts respective of said two fixed stops.

17. The measuring device according to claim 1, further comprising
a second sensing element on said sliding rod opposite said coupler.

* * * * *